United States Patent

Dietz et al.

[11] Patent Number: 5,261,790
[45] Date of Patent: Nov. 16, 1993

[54] RETENTION DEVICE FOR TURBINE BLADE DAMPER

[75] Inventors: Philip W. Dietz; John R. Staker, Cincinnati, both of Ohio

[73] Assignee: General Electric Company, Cincinnati, Ohio

[21] Appl. No.: 830,146

[22] Filed: Feb. 3, 1992

[51] Int. Cl.$^5$ .............................................. F01D 5/26
[52] U.S. Cl. ................................. 416/193 A; 416/500
[58] Field of Search .......... 416/193 A, 219 A, 220 R, 416/248, 500

[56] References Cited

U.S. PATENT DOCUMENTS

| | | | |
|---|---|---|---|
| 1,554,614 | 9/1922 | Allen. | |
| 2,356,605 | 1/1941 | Meininghaus. | |
| 2,912,223 | 11/1959 | Hull, Jr. | |
| 3,037,741 | 6/1962 | Tuft | 416/500 |
| 3,181,835 | 5/1965 | Davis | 416/219 |
| 3,266,771 | 8/1966 | Morley | 416/193 A |
| 3,677,324 | 7/1972 | Higginbotham et al. | 416/241 |
| 4,101,245 | 7/1978 | Hess et al. | 416/193 A |
| 4,182,598 | 10/1980 | Nelson | 416/193 A |
| 4,347,040 | 8/1982 | Jones et al. | 416/190 |
| 4,355,957 | 10/1982 | Sifford et al. | 416/145 |
| 4,494,909 | 1/1985 | Forestier | 416/190 |
| 4,497,611 | 2/1985 | Keller | 415/191 |
| 4,505,642 | 3/1985 | Hill | 416/193 A |
| 4,516,910 | 5/1985 | Bouiller et al. | 416/193 A |
| 4,568,247 | 2/1986 | Jones et al. | 416/190 |
| 4,872,810 | 10/1989 | Brown et al. | 416/145 |
| 4,872,812 | 10/1989 | Hendley et al. | 416/190 |
| 4,917,574 | 4/1990 | Dodd et al. | 416/193 A |
| 4,939,749 | 6/1990 | Arrao et al. | 416/193 A |

*Primary Examiner*—Edward K. Look
*Assistant Examiner*—Michael S. Lee
*Attorney, Agent, or Firm*—Jerome C. Squillaro; John R. Rafter

[57] ABSTRACT

A generally wedge-shaped vibration damper for rotor blades of a gas turbine engine has a pair of scrubbing surfaces and is loosely retained in a pocket incorporated in the root cavity. The pocket is partly defined by a plurality of surfaces which orient the damper so that it is slidably displaceable and rotatable only in a predetermined plane. The retaining device is a hook-shaped sheet metal clip which is attached to the damping member. The clip has a resilient curved portion which is compressed to pass through a throat by which the pocket communicates with the remainder of the root cavity. When the curved portion of the clip clears the throat, it springs back to its uncompressed state in which the height of the curved portion is greater than the height of the throat, whereby the damping member is retained in the pocket.

16 Claims, 3 Drawing Sheets

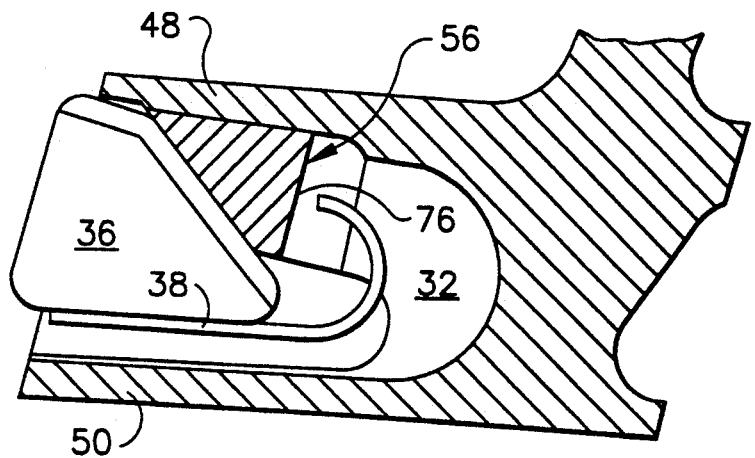
FIG. 4
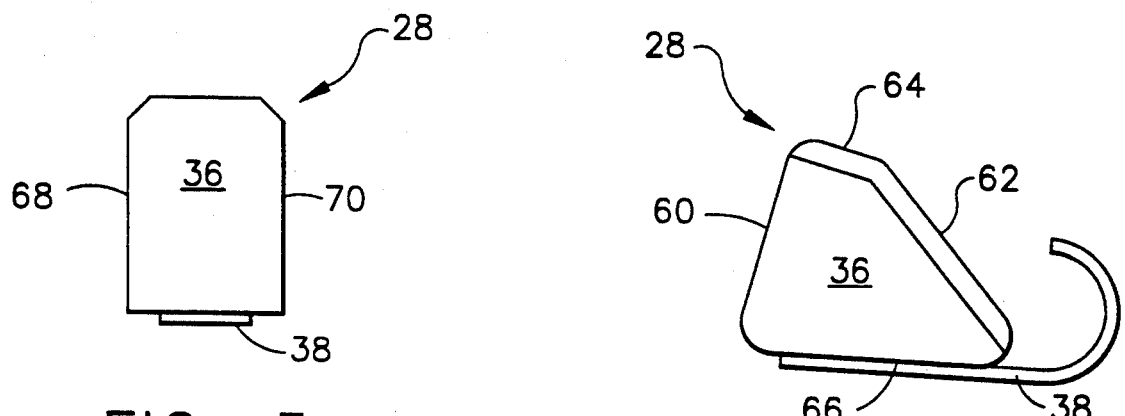
FIG. 5
FIG. 6
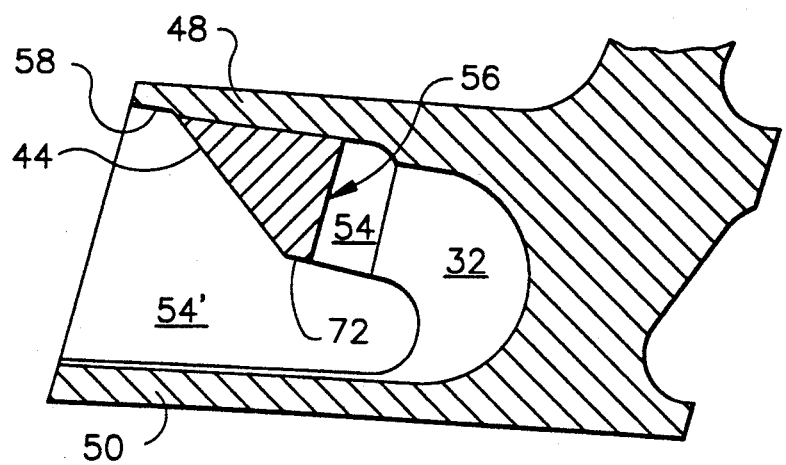
FIG. 7

RETENTION DEVICE FOR TURBINE BLADE DAMPER

FIELD OF THE INVENTION

This invention relates generally to rotors of turbines and compressors in a gas turbine engine. Specifically, the invention relates to an improved mechanism for retaining vibration dampers in compressor or turbine blades of a gas turbine aircraft engine.

BACKGROUND OF THE INVENTION

The present invention is a mechanism incorporated in each of the blades of one or more rotor stages of a compressor or turbine of a gas turbine engine. The blades of the rotor are circumferentially distributed on a disk for rotation therewith about the disk axis. A conventional rotor blade has a root or dovetail portion which is slidably received in a complementarily configured recess provided in the rotor disk, a platform portion located outside the rotor disk, an airfoil portion extending radially outwardly from the platform and a shroud (sometimes segmented) located at the tips of the airfoils, each shroud segment being connected to a corresponding blade tip.

The platforms collectively define a radially outwardly facing wall and the tip shroud segments collectively define a radially inwardly facing wall of an annular gas flow passageway through the engine. The airfoils of the rotor blades extend radially into the passageway to interact aerodynamically with the gas flow therethrough.

These airfoils are subject to fatigue due to vibrations even though the angular speeds are low, for example, 4000 rpm. It is necessary to damp such vibrations to reduce the fatigue on the blades, particularly at or near resonant frequencies.

Various types of blade dampers are known. For example, one type of damper consists of so-called blade-to-ground dampers which generally have a movable member positioned between the coverplate assembly and the underside of the platform of one or more turbine blades. Upon rotation of the turbine, the member is displaced radially outwardly by centrifugal forces to engage the coverplate and underside of a blade platform, thereby perform a damping function. A damper of this type is disclosed in U.S. Pat. No. 4,355,957 to Sifford et al.

Other vibration dampers perform blade-to-blade damping. In one kind of blade-to-blade damper, the damping member is displaced radially outwardly by centrifugal forces during engine operation to engage the undersides of the platforms of adjacent rotor blades. Blade-to-blade dampers of this type are disclosed in U.S. Pat. No. 4,182,598 to Nelson, U.S. Pat. No. 4,347,040 to Jones et al., U.S. Pat. No. 4,568,247 to Jones et al., U.S. Pat. No. 4,872,810 to Brown et al. and U.S. Pat. No. 4,917,574 to Dodd et al.

In the Nelson, Brown and Dodd patents, the dampers are trapped between the rotor disk and the underside of the platform of one or more turbine blades. In the Jones patents, each damper is loosely retained by a rivet which allows radial and circumferential movements.

In yet another type of blade-to-blade damper, a member is placed in a pocket between the platforms of adjacent blades. U.S. Pat. No. 2,912,223 to Hull teaches a spring-like member arranged between the platforms of adjacent blades to damp vibrations of the blades and seal the gap between adjacent platforms. U.S. Pat. No. 4,497,611 to Keller teaches an axial flow turbine wherein a wedge-shaped member is axially displaced by an axial pressure difference, whereby turbine blade vibration is damped.

In accordance with the teaching of U.S. Pat. No. 4,872,812 to Hendley et al., vibration damping and gap sealing are provided by elongated inserts of equilateral triangular cross section loosely received within pockets at the spacing gaps between opposing convex and concave airfoil side edges of adjacent blade platforms. The inserts and pockets are relatively configured to provide self-orientation of the inserts into gap sealing and vibration damping engagement with the platform edges when acted upon by centrifugal forces due to rotor rotation.

An improved vibration damper for a turbine rotor blade was disclosed in U.S. Pat. No. 4,936,749 to Arrao et al. A U-shaped wire-form damping member has its legs respectively slidably received in a pair of inclined recesses which extend into the platform portion of the blade and toward the root portion.

Another blade-to-blade vibration damper for rotor blades of a gas turbine engine is disclosed in copending U.S. patent application Ser. No. 07/770,839 to Steckle et al., entitled "Turbine Blade Platform Damper", now U.S. Pat. No. 5,215,442, which application is commonly assigned to the assignee of the present application. That improved vibration damper comprises a cylindrical shaft and a disk-like contact head connected thereto. The shaft is slidably inserted in a cylindrical recess incorporated in the rotor blade platform.

Finally, U.S. Pat. No. 1,554,614 to Allen discloses a wedge-shaped damper interposed between shroud elements and retained by spring elements carried on the inner sides of the shroud elements.

SUMMARY OF THE INVENTION

An object of the present invention is to improve upon the prior art mechanisms for retaining a vibration damper in a rotor.

Another object of the invention is to provide a platform damper that is able to damp radial motion of the platform associated with torsional vibratory modes of slender, high-aspect-ratio low-pressure turbine blades having platforms overhanging the root or dovetail.

It is yet another object of the invention to incorporate a vibration damper having a mass which can selected to provide optimal damping of undesired torsional vibrations in the rotor blade platform.

A further object of the invention is to provide a damping mechanism which is self-retained in the rotor blade, thereby ensuring foolproof assembly, i.e., the dampers cannot be improperly installed during assembly and the likelihood that the damper will be omitted during assembly is significantly reduced.

Also it is an object to provide a damper which will not jam between adjacent blade platforms, enabling easy disassembly of the rotor without damage to the walls of the pocket in which the damper is retained.

Yet another object of the invention is to provide a damping mechanism which is hidden in the platform portion of a rotor blade, thereby eliminating windage loss.

Also it is an object of the invention to provide a damping mechanism of simple geometry which can be easily and economically retrofitted into existing hardware without compromising the structural integrity of the rotor blade. In particular, it is an object to provide a damper retaining device which attaches to the damping member and does not require additional machining of the rotor blade.

These and other objects are realized in accordance with the invention by providing each rotor blade with a generally wedge-shaped damping member loosely arranged in a corresponding wedge-shaped pocket formed in the root cavity of the blade and having two scrubbing surfaces. The damping member is retained in the pocket by a generally hook-shaped sheet metal clip brazed to the bottom of the damper.

During rotation of the low-pressure turbine rotor, the solid damping member is flung radially outwardly by the centrifugal forces acting thereon. One scrubbing surface of the damping member of each rotor blade bears against the skirt of the adjacent platform when the damping member is located at its radially outermost position. The other scrubbing surface rubs against a corresponding surface formed in the platform of the rotor blade in which the damping member is seated. The scrubbing action, i.e., the relative movement between the dampers and the blade platforms, during operation of the engine serves to damp vibratory radial motion of the platforms. The vibratory energy of the blades is dissipated as heat created by friction between the dampers and the blade platforms.

In accordance with a further aspect of the invention, the damping member is retained inside the pocket by the clip in a manner such that the damper is free to displace in a plane transverse to the rotor axis of rotation in response to centrifugal forces without disengaging from the rotor blade.

One advantage of the improved damper arrangement over prior art devices is that installation of the damper is a simple operation. The curved end of the clip is resilient and can be compressed to pass through a throat between the root cavity and the pocket. The damper can be installed simply by pushing the damper with a force sufficient to compress the clip enough to pass through the throat.

A further advantage of the improved damper arrangement is that after the curved portion of the clip clears the throat, it springs out to an uncompressed state. The result is that the damper is effectively hooked into the rotor blade and retained in the pocket.

Yet another advantage is that the rotor blade need not be machined to allow for attachment of a retaining device thereto. The retaining device is provided simply by brazing the hook-shaped clip to a non-scrubbing surface of the damper.

Yet another advantage is that the angle between the scrubbing surfaces of the generally wedge-shaped damping member can be selected to ensure adequate damping with minimal risk of jamming. In addition, the mass of the damping member can be varied over a wide range without the necessity of modifying the damper wedge angle or the corresponding pocket angle.

A further advantage is that the improved damper arrangement of the invention is inexpensive to manufacture and can be easily reworked into existing hardware.

BRIEF DESCRIPTION OF THE DRAWINGS

These and other advantages of the invention will be better understood when the detailed description of the preferred embodiment of the invention is read in conjunction with the drawings, wherein:

FIGS. 2 through 4 are sectional views showing three states of the damper arrangement in accordance with the preferred embodiment of the invention. FIG. 2 shows the damper during insertion in the pocket as the retaining device is compressed. FIGS. 3 and 4 show the damper retained in the pocket by the uncompressed clip before and during operation of the engine respectively.

FIGS. 5 and 6 are end and side elevational views of the damper with retaining device in accordance with the preferred embodiment of the invention; and FIG. 7 is a sectional view illustrating a portion of a rotor blade which has been retrofitted to incorporate a damper arrangement in accordance with the preferred embodiment of the invention.

DETAILED DESCRIPTION OF THE PREFERRED EMBODIMENT

Figure 1:
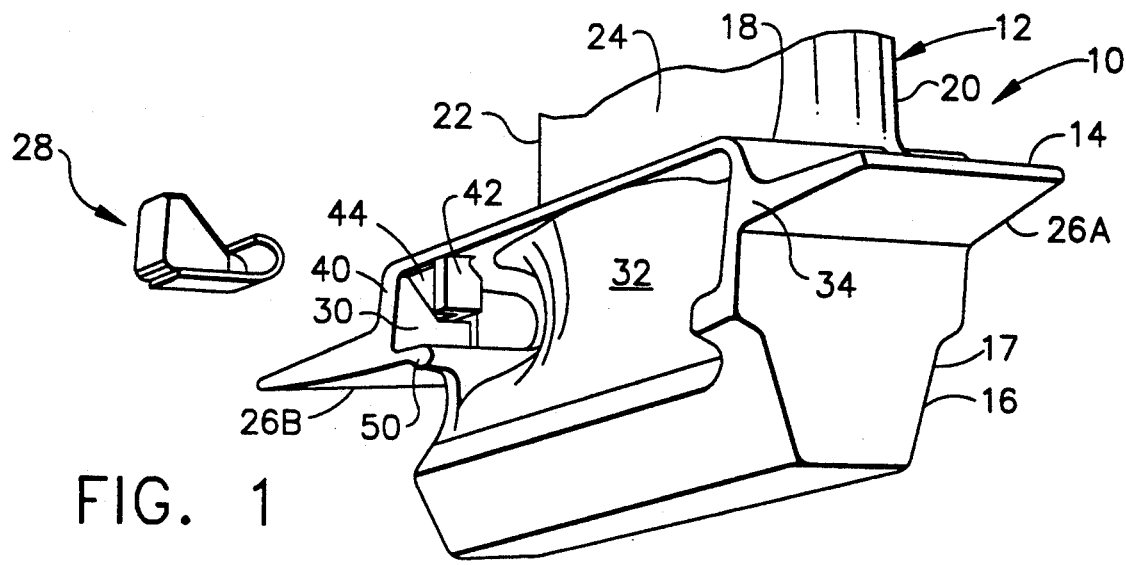
FIG. 1 is a perspective view of the root and platform portions of a rotor blade incorporating a damper retained in a pocket by a retaining device in accordance with the preferred embodiment of the invention.
Figure 1A:
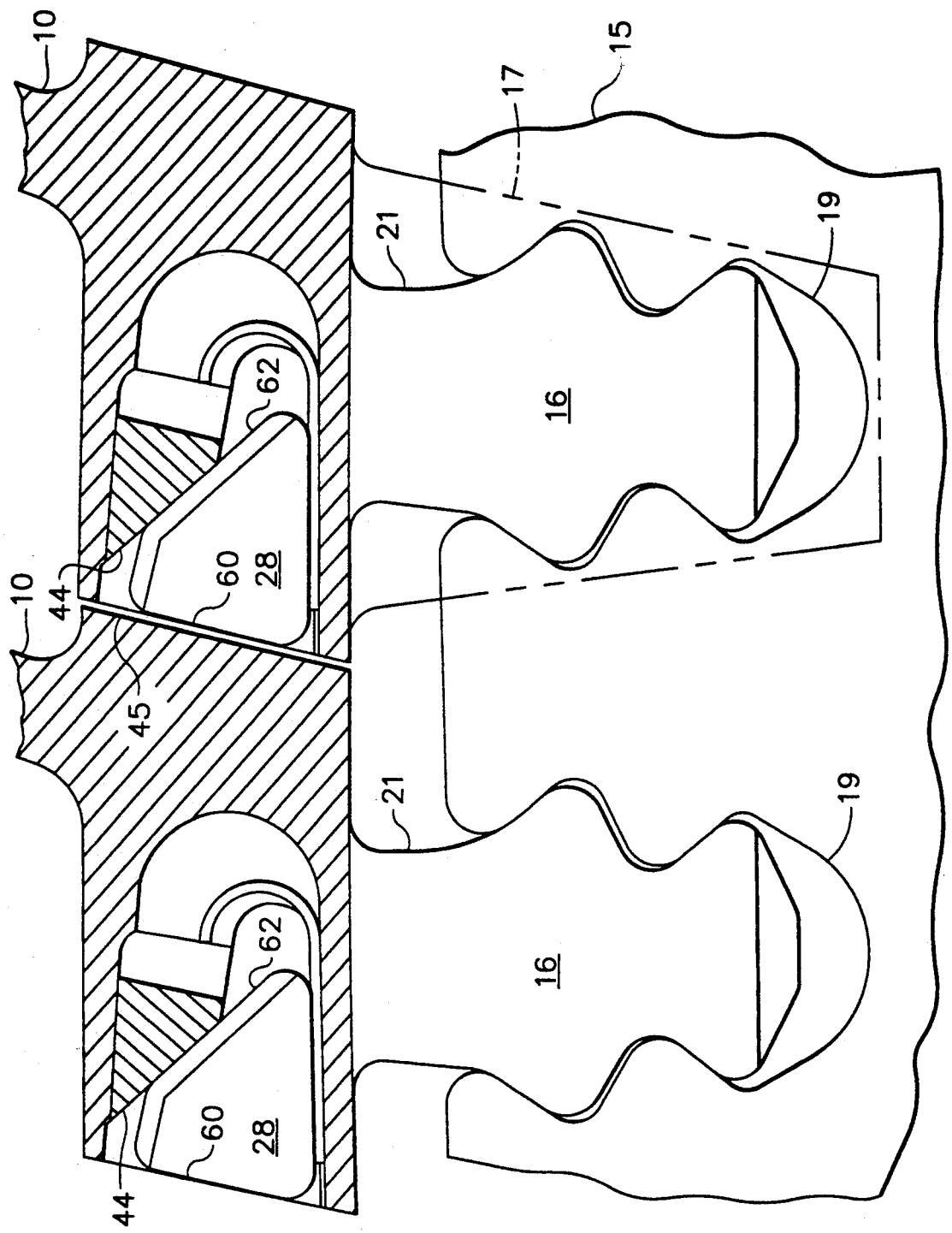
FIG. 1A is a view of a plurality of the blades of FIG. 1 assembled in a disk with cutaways of the shank and platform portions of the blades to illustrate the installation of the damper of FIG. 1 in each blade.

Referring to FIG. 1, it can be seen that each rotor blade 10 has an airfoil portion 12, a platform portion 14 and a root or dovetail portion 16 (the dovetail shown in FIG. 1 has an outer surface 17 which has not been machined to final shape). A plurality of such rotor blades 10 are circumferentially distributed on the periphery of a rotor disk 15 shown in FIG. 1A. The root or dovetail portion 16 of each rotor blade slides into a complementarily configured axially disposed recess 19 in the disk 15, thereby securing the rotor blade to the disk, wherein a final-machined outer surface 21 of dovetail 16, which exhibits a conventional fir-tree shape and which is obtained by a process known in the art, interfaces with mating surfaces of recess 19 of disk 15. FIG. 1A compares outer surface 17 which exists prior to machining, and which corresponds to the shape of dovetail 16 shown in FIG. 1, to final-machined outer surface 21 for one of the blades 10.

The airfoils extend radially outwardly into an annular flow passageway (not shown) defined between radially outwardly facing cylindrically segmented surfaces 18 of the platforms 14 and a radially inwardly facing surface (not shown) of a tip shroud. The rotor is journalled for rotation about a horizontal axis (not shown) such that the airfoils rotate in the annular flow passageway in response to axial flow of gas from a combustor (not shown) through the passageway. Each airfoil has a rounded leading edge 20 directed toward the gas flow, a trailing edge 22, a convex suction surface 24 and a concave pressure surface (not shown).

The platform of the improved rotor blade is generally a solid body having a recess 32 and a leading side surface 34 on the suction side, a forward extension 26A and a rearward extension 26B. A recess and lagging side surface on the pressure side are not visible in FIG. 1. The forward and rearward extensions 26A and 26B are generally slightly rounded segmented members having a surface of revolution generated about the axis of the rotor disk.

The entire rotor blade is preferably an integrally formed cast-and-machined member. The airfoil extends radially outwardly from platform radially outer surface 18 to the tip shrouds (not shown). When exposed to the gas flow, the airfoil is subjected to both flexural and torsional stresses. Torsional vibrations occur in the airfoil which need to be damped by a suitable damping device. This torsional vibration can cause radial motion of the rear edge of the platform on the pressure side. In accordance with the invention, a damping device is incorporated in the platform portion of each rotor blade at a position such that it damps torsional vibration.

In accordance with the first preferred embodiment of the invention, a conventional rotor blade can be retrofitted to incorporate a generally block-shaped insert 56 which is installed into a machined recess and then secured to the blade by braze. A wedge-shaped pocket 30 is then machined into a portion of the blade and a portion of insert 56 for receiving a generally wedge-shaped damping member 28 shown in FIG. 1. The insert 56 has a side wall 42 with a machined planar surface that is parallel to the opposing machined surface of aft wall 40 and an inclined wall 44 with a machined planar surface perpendicular to the machined surface of side wall 42. The side wall 42 generally lies in a plane transverse to the axis of rotation. The bottom of side wall 42 is not connected to the bottom wall 50 of platform 14 so as to yield a lighter-weight design and to retain root flexibility.

Alternatively, the wedge-shaped pocket 30 could be cast into a new blade or, for even greater precision, the pocket 30 could be cast and then machined into a new blade. These methods of manufacturing a rotor blade having a wedge-shaped pocket for receiving a vibration damper are described in detail in co-pending U.S. patent application Ser. No. 07/830,143 to Philip W. Dietz, entitled "Turbine Blade Damper", which application is commonly assigned to the assignee of the present application. The specification and drawings of that co-pending application are specifically incorporated by reference herein.

Although the retention device of the present invention will be described in detail below with reference to a rotor blade retrofitted with a pocket for receiving the vibration damper, it will be understood that the retention device is equally applicable to rotor blades cast with a pocket.

A portion of such a retrofitted rotor blade is depicted in FIG. 7 with the damper not installed. The root cavity of the conventional rotor blade is denoted by the numeral 32. Numeral 54 indicates a portion of the L-shaped recess formed by the first electrode discharge machining (EDM), as taught by the aforementioned co-pending application to Dietz et al. Block 56 is joined to the platform by brazing, i.e., a side surface of block 56 is brazed to the machined surface of aft wall 40 and a top surface of block 56 is brazed to the machined surface of top wall 48.

Block 56 is then machined by a second EDM step to form inclined wall 44. The width of the inclined wall is less than the full width of the block, i.e., a predetermined thickness of metal in the forward portion of the block is not removed by EDM, thereby forming side wall 42. At the same time, the fillet radius connecting the aft wall 40 and the bottom wall 50 of the platform is cleaned out to provide clearance for the hook-shaped retaining clip 38 (see FIG. 6) when damper arrangement 28 is installed in pocket 30. The recess formed by this second EDM step is denoted by numeral 54' in FIG. 7. Also, the electrode removes additional material from the top wall 48, forming surface 58 thereon.

After inclined wall 44 has been formed, the rotor blade is ready for assembly. Each of the pocket-defining surfaces of walls 40, 42 and 44 is substantially planar. The opposing machined surfaces of walls 40 and 42 are substantially mutually parallel. The machined surface of inclined wall 44 is substantially perpendicular to the machined surfaces of walls 40 and 42. The angle of inclination of the machined surface of inclined wall 44 relative to the radial axis of the rotor blade will depend on the vertex angle between the scrubbing surfaces 60 and 62 (see FIG. 6) of the wedge-shaped damper 28, which in the preferred embodiment is 55 degrees.

Each rotor blade is mounted on the rotor disk with a damper arrangement 28 as depicted in FIGS. 5 and 6 installed therein. Damper arrangement 28 comprises a generally wedge-shaped damping member 36 brazed to a hook-shaped sheet metal retaining clip 38.

More particularly, damping member 36 is a generally wedge-shaped plate having a substantially convex quadrilateral cross section. Thus, the inventors intend to include a truncated wedge shape within the definition of the term "generally wedge-shaped". The four surfaces of damping member 36 are labeled 60, 62, 64 and 66 in FIG. 6. Surfaces 60 and 62 are scrubbing surfaces. The side edges of surfaces 62 and 64 of damping member 36 are chamfered or radiused, as best seen in FIG. 5. In the preferred embodiment, the damping member is made of L605 cobalt-based alloy.

The hook-shaped retaining clip 38 comprises a straight portion and a curved portion. Damping member 36 is joined to retaining clip 38 by brazing surface 66 to the straight portion of the clip. The clip is preferably made of a resilient metal, such as Inco 718 or Rene 41, both of which are nickel-based alloys. Alternatively, a cobalt alloy such as Haynes 188 can be utilized. The metal used to make the clip should have a high-temperature capability, i.e., be able to perform the retaining function reliably at temperatures in excess of 1300° F. The aforementioned nickel-based alloys are preferable to Haynes 188 alloy because at room temperature—the temperature at which the damper is installed in. the rotor blade—nickel-based alloys provide more spring in the curved portion of clip 38 than the cobalt alloy provides.

Figure 2:
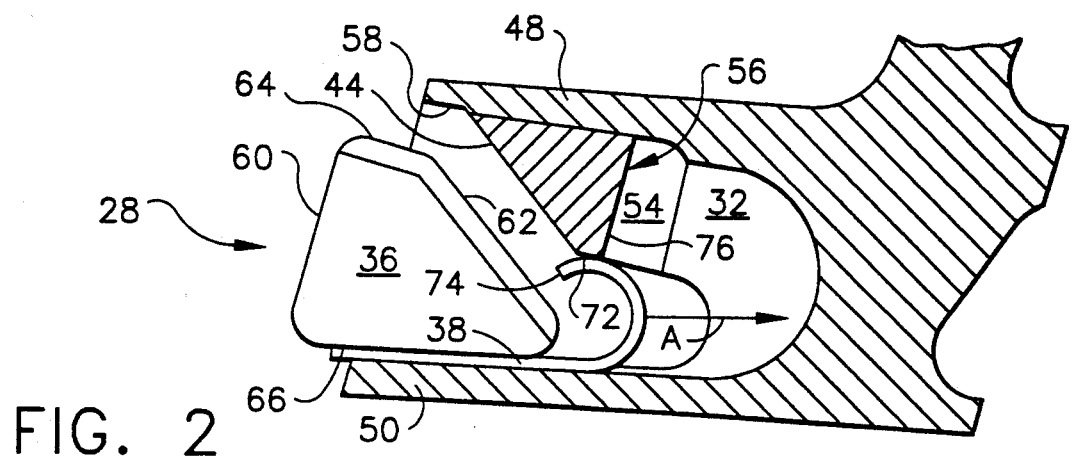

The installation of the damper having a retaining device in accordance with the preferred embodiment of the invention is shown in FIG. 2. The damper arrangement 28 is inserted into the wedge-shaped pocket with the retaining clip 38 leading the damping member 36. The damper arrangement is disposed so that the curved portion of the clip 38 engages the lower edge 72 of inclined wall 44. Edge 72 and bottom wall 50 define a throat having a height which is less than the height of the curved portion of clip 38. Damper arrangement 36 is then pushed in the direction indicated by arrow A with sufficient force to overcome the resistance to compression of the curved portion of clip 38. The curved portion of clip 38 is compressed as it passes through the throat between edge 72 and bottom wall 50.

Figure 3:
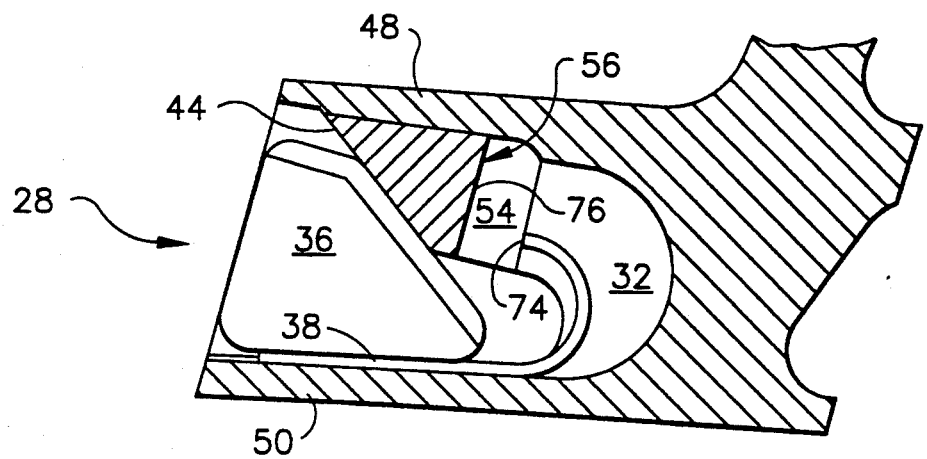

When the curved portion of clip 38 has cleared the edge 72, it springs back into its uncompressed state, as indicated in FIG. 3. Because the tip 74 of the curved portion of clip 38 sits at a height greater than the height of the throat between edge 72 and bottom wall 50, tip 74 will engage the back surface 76 of insert 56 when damper arrangement 36 is displaced in a direction opposite to the direction indicated by arrow A. Thus, the damping member 36 will be retained in pocket 30 by clip 38. In the event that the damper needs to be replaced, it can be removed simply by pulling on the damping member 36 with sufficient force to overcome the resistance to expansion of the curved portion of clip 38.

The preferred embodiment of the damper is depicted in the assembled state and during operation in FIG. 4. In the installed state, the insert 56, damping member 36 and clip 38 are configured to retain the damping member 36 in pocket 30 with play in the radial and circumferential directions. When the rotor disk rotates, the damping member is subjected to centrifugal forces which cause the damping member to slidably displace. Side walls 68 and 70 of the damping member are constrained from displacement in the axial direction by the opposing machined surfaces of aft wall 40 and side wall 42 respectively. Thus, damper displacement is confined to a plane substantially transverse to the axis of rotation.

Although in the preferred embodiment, the surfaces of walls 40, 42, 68 and 70 are all planar, it will be appreciated that only one of each pair of opposing surfaces need be planar. This is because the other surface need only have a plurality of contact points which lie in a plane parallel to the plane of the opposing planar surface and are spaced sufficiently far apart to preclude tilting of the damping member out of the plane of slidable displacement.

The damper 28 slides radially outwardly and circumferentially until the scrubbing surface 60 abuts the platform of the adjacent rotor blade. The damper 28 adjusts automatically under centrifugal loading to bear against the adjacent platform despite variations in the width of the gap between platforms.

During vibration of the rotor blades, scrubbing surface 62 rubs against the surface of inclined wall 44 and scrubbing surface 60 rubs against a side surface 45 of the platform of the adjacent rotor blade as shown in FIG. 1A. The friction of this scrubbing action dissipates energy, thereby damping the vibrations. The blade-to-blade friction scrubbing action due to this forced engagement damps vibratory motion in the radial and axial directions of the platforms of both rotor blades. Each pair of adjacent rotor blades are similarly coupled.

To prevent jamming of the damping member between adjacent platforms while achieving optimum damping, the angle between the scrubbing surfaces on the damping member is critical. Tests performed by the inventors indicate the damper is effective for vertex angles beginning with 75 degrees, becoming more effective for smaller angles. A preferred angle of 55 degrees was selected as the smallest angle achievable without jamming.

The damping effect can be increased by adding mass to the damping member. Although a wedge-shaped damping member of substantially triangular cross section could be employed as an alternative embodiment, the damping effect can be increased by adding depth to the damping member, i.e., by making a damping member of substantially quadrilateral cross section. This added mass increases the forces normal to the scrubbing surfaces of the damping member, thereby increasing the force of friction and correspondingly the amount of energy dissipated by friction during rubbing of the scrubbing surfaces. It should be noted, however, that surface 64 of the damping member does not rub against machined surface 58 of top wall 48.

The preferred embodiments have been described in detail hereinabove for the purpose of illustration only. It will be apparent to a practitioner of ordinary skill in the art of gas turbine engines that various modifications could be made to the above-described structures without departing from the spirit and scope of the invention as defined in the claims set forth hereinafter.

For example, it will be obvious that the damping device of the present invention could be located at other positions such that it damps undesirable vibratory motion occurring at other portions of the platform. In addition, if desired, the pocket for receiving the damping element could extend into the platform from the leading side thereof and the damping member could be arranged to move outwardly along the wall of the recess to engage the opposing lagging side surface of the adjacent blade.

We claim:

1. A vibration damping device comprising:
   a solid body having a first planar surface and a clip having a first portion attached to said solid body and a second portion which is not in contact with said solid body, wherein said second portion is made of resilient material;
   wherein said clip is hook-shaped and made of sheet metal, said first portion of said clip being straight and said second portion of said clip being curved;
   wherein said solid body is generally wedge-shaped and has a second planar surface disposed at a predetermined angle relative to said first planar surface, said predetermined angle being less than 75 degrees and greater than 45 degrees.

2. The vibration damping device as defined in claim 1, wherein said solid body further has mutually parallel first and second planar side surfaces, each of said first and second planar surfaces being substantially perpendicular to said planar side surfaces.

3. A rotor blade for a rotor of an engine having an axis of rotation, comprising a root portion, a platform portion connected to said root portion and having a pocket form therein, an airfoil portion connected to said platform portion, a damping member loosely arranged in said pocket and having a first scrubbing surface, and means for retaining said damping member in said pocket, wherein said retaining means comprises a clip which is carried by said damping member and a back surface of an insert which is brazed to said platform portion.

4. A rotor blade for a rotor of an engine having an axis of rotation, comprising:
   a root portion, a platform portion connected to said root portion and having a pocket formed therein, an airflow portion connected to said platform portion, a damping member loosely arranged in said pocket and having a first scrubbing surface, and means for retaining said damping member in said pocket, wherein said retaining means is carried by said damping member;
   wherein said platform portion has a cavity which communicates with said pocket via a throat having a predetermined height, said retaining means having a resilient portion arranged inside said cavity in an uncompressed state, said resilient portion having a height greater than said predetermined height.

5. A rotor blade for a rotor of an engine having an axis of rotation, comprising:
   a root portion, a platform portion connected to said root portion and having a pocket formed therein, an airflow portion connected to said platform portion, a damping member loosely arranged in said pocket and having a first scrubbing surface, and means for retaining said damping member in said pocket, wherein said retaining means is carried by said damping member;

wherein said damping member comprises a solid body and said retaining means comprises a clip having a first portion attached to said solid body and a second portion made of resilient material which is not in contact with said solid body.

6. The rotor blade for a rotor of an engine as defined in claim 5, wherein said clip is hook-shaped and made of sheet metal, said first portion of said clip being straight and said second portion of said retaining device being curved.

7. The rotor blade for a rotor of an engine as defined in claim 5, wherein said solid body is made of cobalt-based alloy and said clip is made of nickel-based alloy.

8. The rotor blade for a rotor of an engine as defined in claim 5, wherein said solid body and said clip are made of cobalt-based alloy.

9. The rotor blade for a rotor of an engine as defined in claim 5, wherein said solid body is generally wedge-shaped and has a second scrubbing surface disposed at a predetermined angle relative to said first scrubbing surface, said predetermined angle being less than 75 degrees and greater than 45 degrees.

10. The rotor blade for a rotor of an engine as defined in claim 9, further comprising means for orienting said wedge-shaped damping member such that said damping member is slidably displaceable and rotatable only in a predetermined plane during rotation of said rotor, said orienting means defining said pocket in part.

11. A rotor assembly for an engine comprising:
a rotor disk comprising first and second means for receiving a root portion of a rotor blade arranged on the outer circumference of said rotor disk;
first and second rotor blades each comprising a root portion, a platform portion connected to said root portion and having a pocket, and an airfoil portion connected to said platform portion said root portions of said first and second rotor blades being received by said first and second receiving means respectively; and
means for rotatably supporting said rotor disk for rotation about an axis,
wherein said first rotor blade further comprises a damping member loosely arranged in said pocket and having a first scrubbing surface, and means for retaining said damping member in said pocket, wherein said retaining means comprises a clip which is carried by said damping member and a back surface of an insert which is brazed to said platform portion of said first rotor blade.

12. A rotor assembly for an engine comprising:
a rotor disk comprising first and second means for receiving a root portion of a rotor blade arranged on the outer circumference of said rotor disk;
first and second rotor blades each comprising a root portion, a platform portion connected to said root portion and having a pocket, and an airfoil portion connected to said platform portion, said root portions of said first and second rotor blades being received by said first and second receiving means respectively; and
means for rotatably supporting said rotor disk for rotation about an axis,
wherein said first rotor blade further comprises a damping member loosely arranged in said pocket and having a first scrubbing surface, and means for retaining said damping member in said pocket, said retaining means being carried by said damping member; and
wherein said platform portion of said first rotor blade has a cavity which communicates with said pocket via a throat having a predetermined height, said retaining means having a resilient portion arranged inside said cavity in an uncompressed state, said resilient portion having a height greater than said predetermined height.

13. A rotor assembly for an engine comprising:
a rotor disk comprising first and second means for receiving a root portion of a rotor blade arranged on the outer circumference of said rotor disk;
first and second rotor blades each comprising a root portion, a platform portion connected to said root portion and having a pocket, and an airfoil portion connected to said platform portion, said root portions of said first and second rotor blades being received by said first and second receiving means respectively; and
means for rotatably supporting said rotor disk for rotation about an axis,
wherein said first rotor blade further comprises a damping member loosely arranged in said pocket and having a first scrubbing surface, and means for retaining said damping member in said pocket, said retaining means being carried by said damping member; and
wherein said damping member comprises a solid body and said retaining means comprises a clip having a first portion attached to said solid body and a second portion made of resilient material which is not in contact with said solid body.

14. The rotor assembly for an engine as defined in claim 13, wherein said clip is hook-shaped and made of sheet metal, said first portion of said clip being straight and said second portion of said retaining device being curved.

15. The rotor assembly for an engine as defined in claim 13, wherein said solid body is generally wedge-shaped and has a second scrubbing surface disposed at a predetermined angle relative to said first scrubbing surface, said predetermined angle being less than 75 degrees and greater than 45 degrees.

16. The rotor assembly for an engine as defined in claim 15, further comprising means for orienting said wedge-shaped damping member such that said damping member is slidably displaceable and rotatable only in a predetermined plane during rotation of said rotor, said orienting means defining said pocket in part, whereby said damping member is moved to a scrubbing position by the centrifugal forces acting thereon whereat said first and second scrubbing surfaces of said damping member of said first rotor blade respectively bear against a predetermined surface of the platform portion of said second rotor blade and a predetermined surface in said pocket of said first rotor blade during rotation of said rotor.

* * * * *